United States Patent
Pacella et al.

(10) Patent No.: US 8,225,400 B2
(45) Date of Patent: Jul. 17, 2012

(54) SECURITY OVERLAY NETWORK

(75) Inventors: Dante J Pacella, Charles Town, WV (US); Harold J Schiller, Silver Spring, MD (US); Norman R Solis, Fairfax, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 924 days.

(21) Appl. No.: 12/119,891

(22) Filed: May 13, 2008

(65) Prior Publication Data
US 2009/0288157 A1    Nov. 19, 2009

(51) Int. Cl.
*H04L 29/06* (2006.01)
*G06F 11/30* (2006.01)
(52) U.S. Cl. .................................. 726/23; 726/1; 726/14
(58) Field of Classification Search .................. None
See application file for complete search history.

(56) References Cited

U.S. PATENT DOCUMENTS

| | | | | |
|---|---|---|---|---|
| 7,136,374 | B1* | 11/2006 | Kompella | 370/352 |
| 7,463,639 | B1* | 12/2008 | Rekhter | 370/409 |
| 7,535,870 | B2* | 5/2009 | Nikander et al. | 370/331 |
| 7,584,503 | B1* | 9/2009 | Palmer et al. | 726/9 |
| 7,620,069 | B2* | 11/2009 | Kompella | 370/469 |
| 7,797,411 | B1* | 9/2010 | Guruswamy et al. | 709/223 |
| 7,882,555 | B2* | 2/2011 | Ben-Itzhak | 726/13 |
| 7,983,286 | B2* | 7/2011 | Rekhter | 370/409 |
| 8,009,674 | B2* | 8/2011 | Kompella | 370/392 |
| 2004/0148520 | A1* | 7/2004 | Talpade et al. | 713/201 |
| 2006/0236394 | A1* | 10/2006 | Morrow et al. | 726/23 |
| 2009/0285181 | A1* | 11/2009 | Nikander et al. | 370/331 |

* cited by examiner

*Primary Examiner* — Christopher Revak

(57) ABSTRACT

A device receives an indication of detected attack traffic associated with a network, identifies a victim of the attack traffic, and selects a security platform for processing the attack traffic. The device also advertises a tunnel and routing tag information in the network for the selected security platform, receives the attack traffic via the advertised tunnel, and forwards the attack traffic to the selected security platform for processing. The device further receives processed traffic from the selected security platform, and forwards, via the network, the processed traffic to the victim.

24 Claims, 11 Drawing Sheets

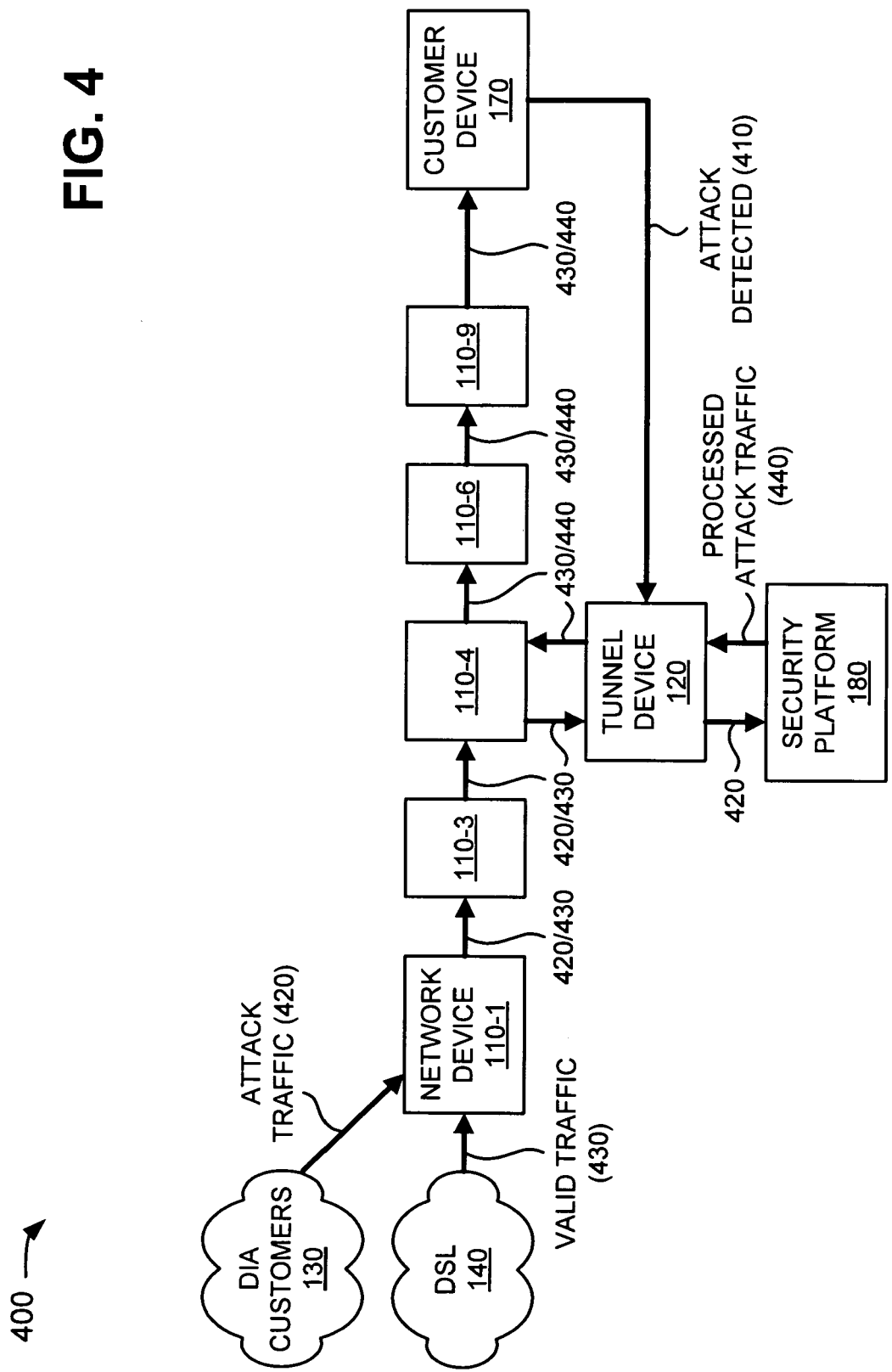

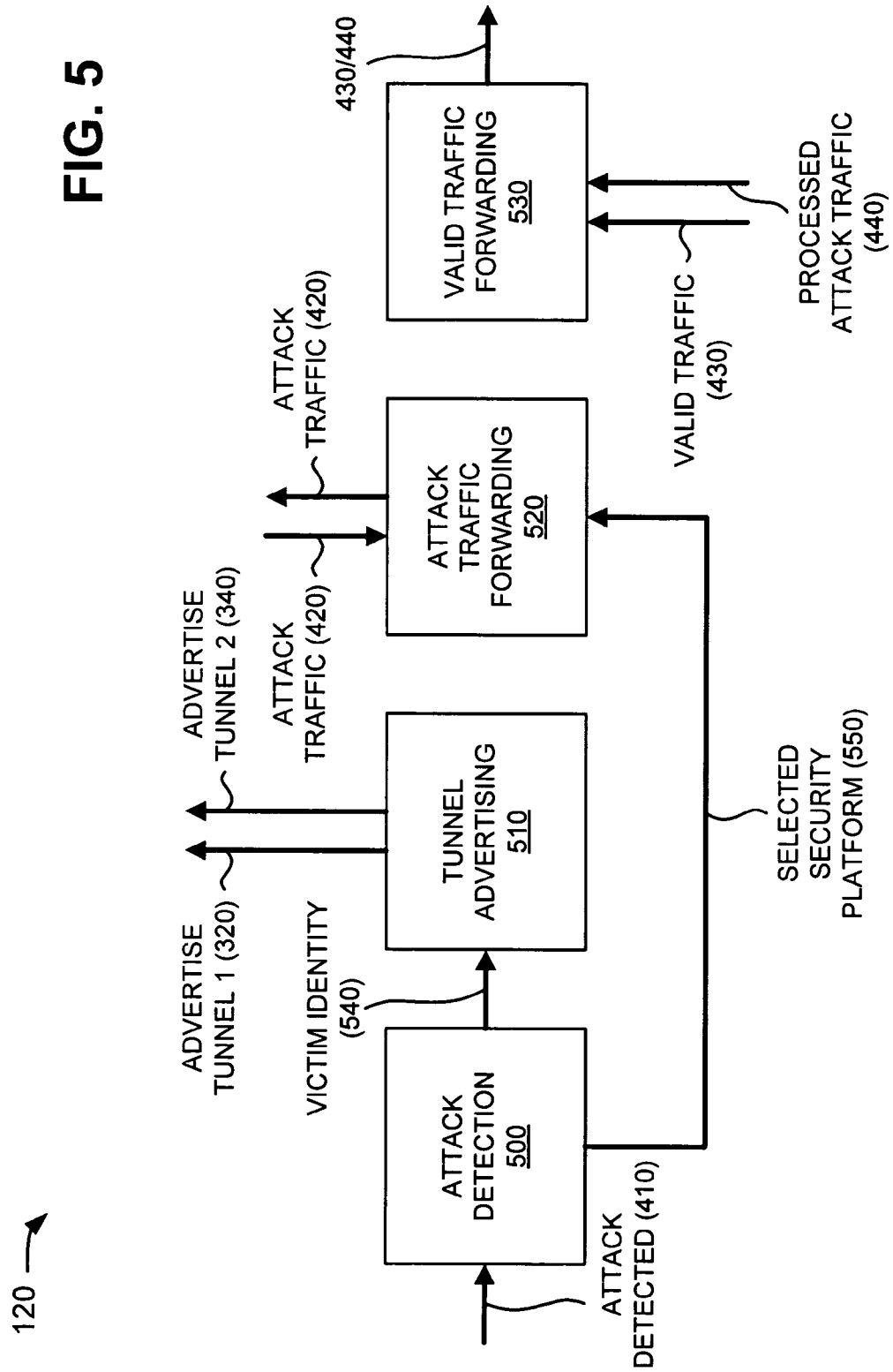

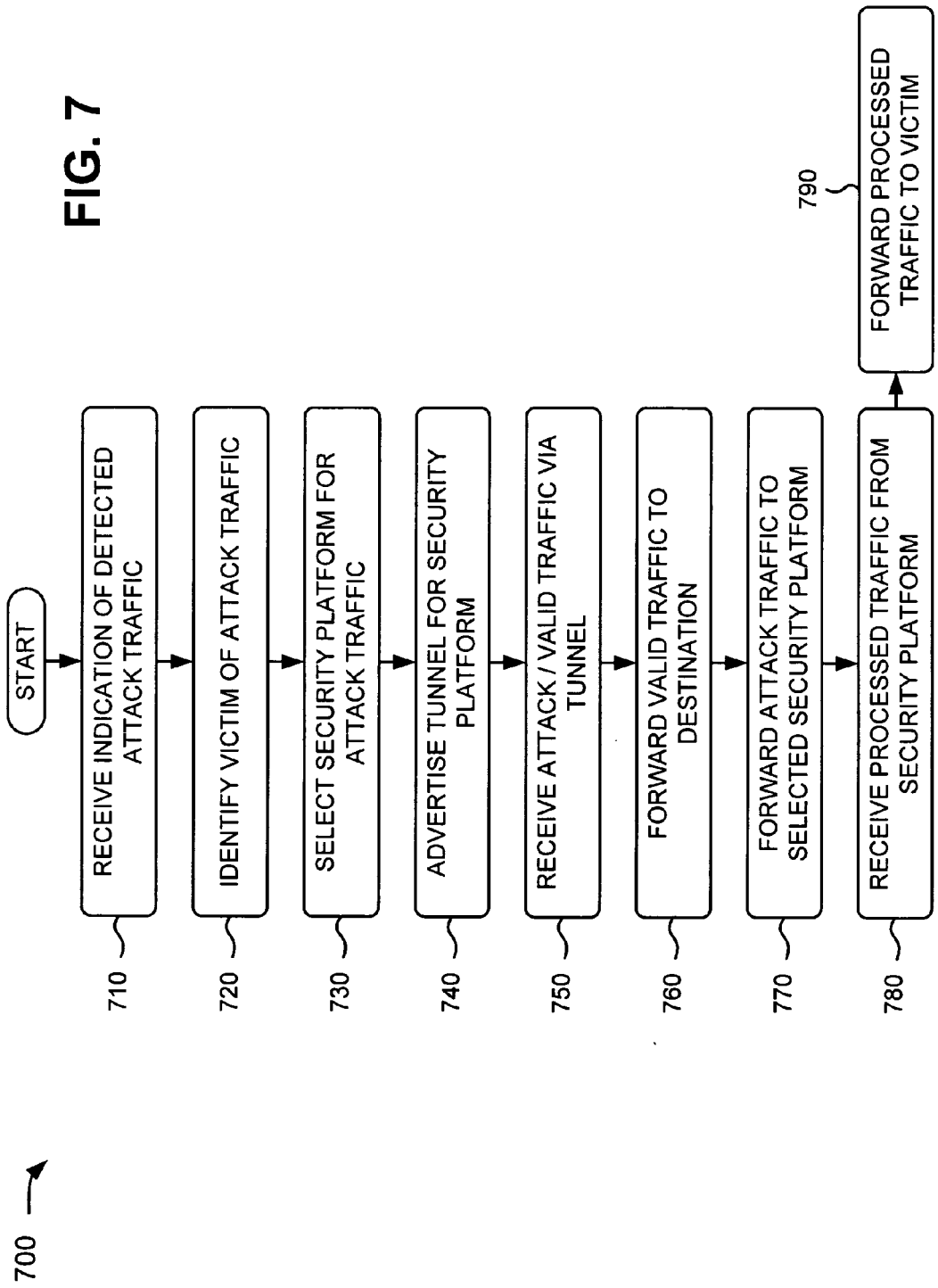

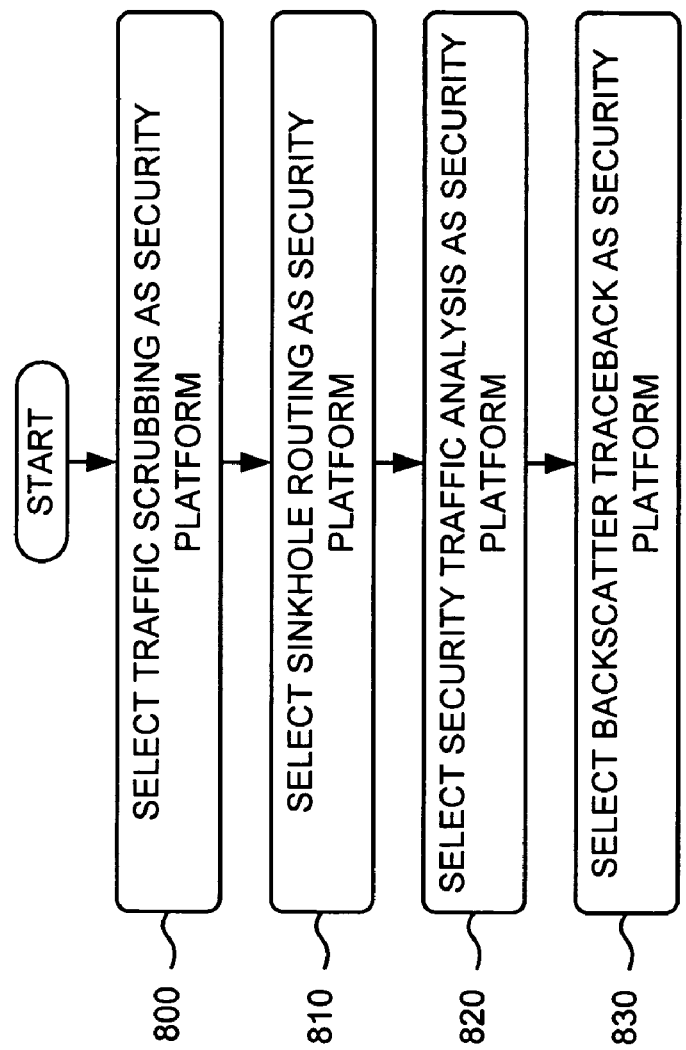

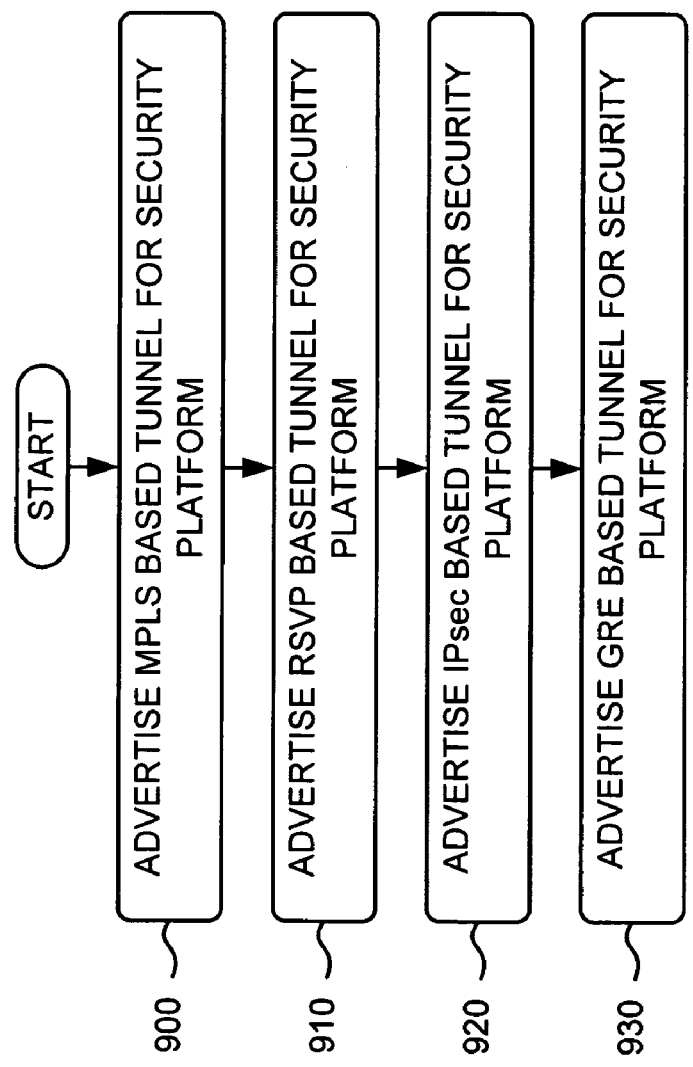

SECURITY OVERLAY NETWORK

BACKGROUND

Attack traffic may include denial of service (DoS) attacks, port scans and network probes to detect and exploit system vulnerabilities, protocol-based attacks on intermediary routing systems, etc. DoS attack traffic may be characterized by explicit attempts of attackers to prevent legitimate users from using a service. Host or application-level attacks are a concern for many service providers as well as end-site customers. In general, each of these DoS attack vectors continues to be a major threat facing end sites. As service providers develop value added revenue sources based on Internet protocol (IP) application services, the open nature of the IP infrastructure may put those revenue sources at risk. Availability means that the service is accessible when desired. Excessive traffic and resource depletion attacks may use either forged or spoofed source addresses or compromised hosts (e.g., botnets). These mechanisms increase the difficulty in tracing an attack back to the initiator of the attack. Routing protocol-based attacks can be used to compromise legitimate routing and forwarding.

Current network security systems utilize traffic scrubbing, blackhole routing, sinkhole routing, intrusion detection systems, and backscatter traceback techniques to address attack traffic. For example, current network security systems divert attack traffic to a traffic scrubbing device or a set of distributed or centralized traffic scrubbing devices. The traffic scrubbing device forwards valid or legitimate traffic to its destination, and discards the attack traffic. In blackhole routing, a network administrator identifies a host under attack, and null routes (or discards) all traffic destined for the host, whether legitimate or illegitimate. A sinkhole is part of a network that advertises certain ranges on IP addresses and attracts traffic destined for those ranges so that it can be analyzed. Backscatter traceback is primarily useful for spoofed attacks where the attackers use source addresses from the IP address space. The replies to the spoofed addresses are analyzed in aggregate by a central administration to detect and characterize spoofed attacks.

However, current network security systems route attack traffic through an open network so that the attack traffic may be analyzed. This may permit the attack traffic to be detected and utilized by the attackers. Furthermore, most centralized network security systems do not permit attack traffic to be processed (e.g., analyzed, scrubbed, etc.) and forwarded to its destination address. For example, blackhole routing mechanisms discard the attack traffic, and sinkhole routing mechanisms only analyze the attack traffic before discarding it. Traffic scrubbing primarily relies on costly devices deployed in-line to every potential attack vector to enable the "clean" portion of traffic to be forwarded to its destination. Other solutions to this in-line approach would entail exposing the fact that the traffic is diverted and inconveniencing the customer.

BRIEF DESCRIPTION OF THE DRAWINGS

FIG. 4 illustrates a diagram of another exemplary portion of the network depicted in FIG. 1 and exemplary interactions among the components of the other exemplary portion;

FIG. 5 depicts a diagram of exemplary functional components of the tunnel device of the network depicted in FIG. 1;

FIGS. 7-9 illustrate flow charts of an exemplary process according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may provide a security overlay network that may advertise one or more tunnels directed to a security platform or array of platforms, and may direct attack traffic to the security platform via the one or more tunnels. Systems and/or methods may process the attack traffic via the security platform, and may forward the processed traffic to its destination. For example, in one implementation, a device (e.g., a split topology tunnel device) may receive an indication of detected attack traffic, may identify a victim of the attack traffic, and may select a security platform for the attack traffic. The device may advertise a tunnel and tag information for the security platform, may receive valid and attack traffic via the tunnel, and may forward the valid traffic to a destination associated with the valid traffic. Depending on the tag information, the device may forward the attack traffic to the selected security platform via the tunnel, may receive processed (e.g., analyzed, scrubbed, etc.) traffic back from the security platform, and may forward the processed (or clean) traffic to the victim of the attack traffic using a secondary or non-tunneled topology.

Figure 1:
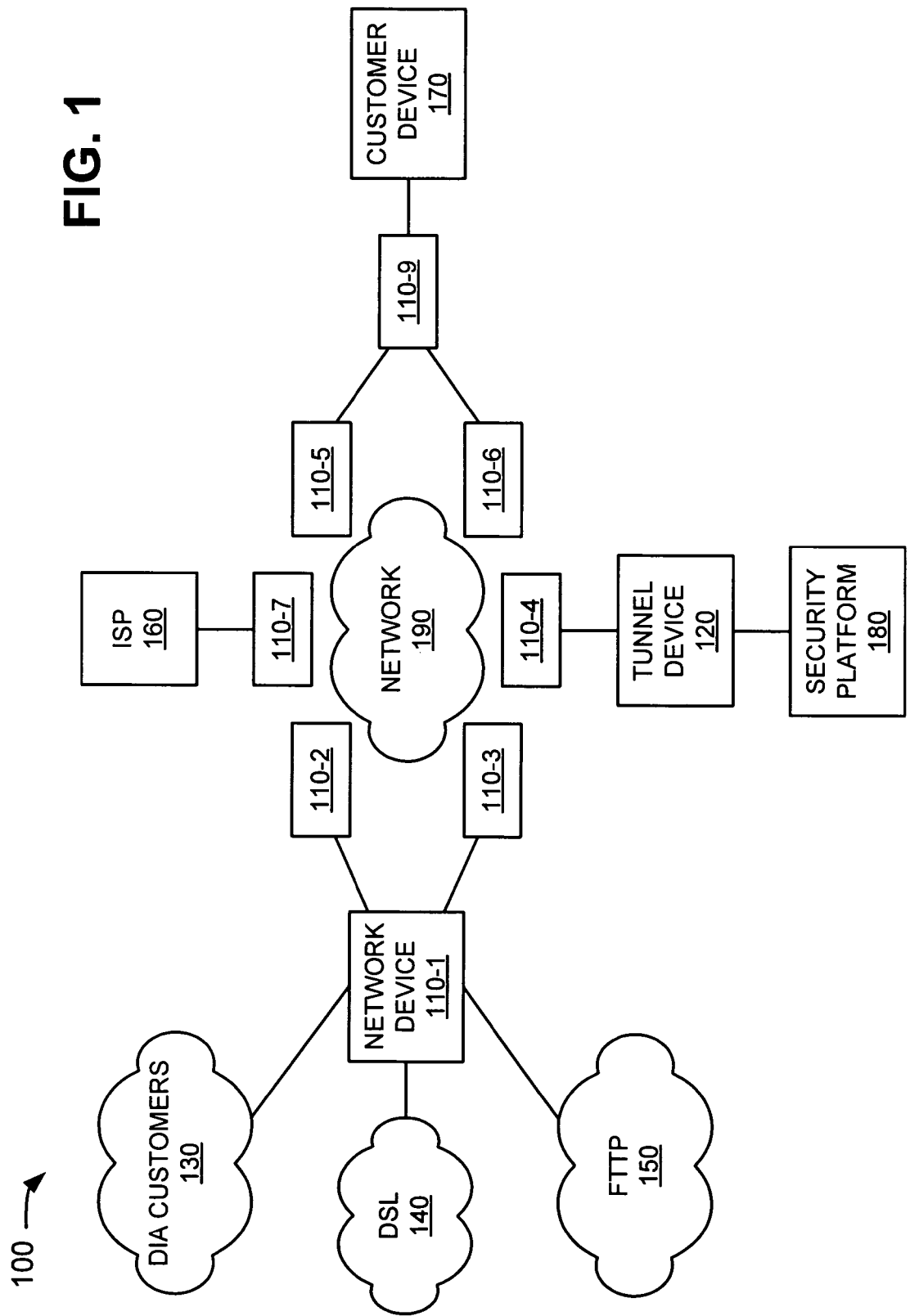
FIG. 1 is a diagram of an exemplary network in which systems and methods described herein may be implemented.

FIG. 1 is a diagram of an exemplary network 100 in which systems and methods described herein may be implemented. As illustrated, network 100 may include network devices 110-1, . . . , 110-9 (collectively referred to herein as "network devices 110" and singularly as "network device 110"), a tunnel device 120, a dedicated Internet access (DIA) customers network 130, a digital subscriber line (DSL) network 140, a fiber-to-the-premises (FTTP) network 150, an internet service provider (ISP) 160, a customer device 170, and a security platform 180 interconnected by a network 190. Network devices 110, tunnel device 120, DIA customers network 130, DSL network 140, FTTP network 150, ISP 160, customer device 170, and security platform 180 may connect to network 190 via wired and/or wireless connections. Multiple network devices, and a single tunnel device, DIA customers network, DSL network, FTTP network, ISP, customer device, security platform, and network have been illustrated in FIG. 1 for simplicity. In practice, there may be more network devices, tunnel devices, DIA customers networks, DSL networks, FTTP networks, ISPs, customer devices, security platforms, and/or networks. Also, in some instances, one or more of the components of network 100 may perform one or more functions described as being performed by another one or more of the components of network 100.

Each of network devices 110 may include a data transfer device, such as a gateway, a router, a switch, a firewall, a network interface card (NIC), a hub, a bridge, a proxy server, an optical add-drop multiplexer (OADM), a line access multiplexer (LAM), a permanent or private virtual circuit (PVC), links provided between any of the aforementioned devices, or some other type of device that processes and/or transfers data. In one implementation, each of network devices 110 may be capable of establishing an end-to-end path between components of network 100.

Tunnel device 120 may include a split topology data transfer device, such as a gateway, a router, a switch, a firewall, a NIC, a hub, a bridge, a proxy server, an OADM, a LAM, a PVC, links provided between any of the aforementioned devices, or some other type of split topology device that processes and/or transfers data. For example, in one implementation, tunnel device 120 may receive attack traffic from a first topology (e.g., that may include one or more of network devices 110 with discrete connectivity), and may forward processed attack traffic to its destination via a second topology (e.g., that may include one or more of network devices 110).

DIA customers network 130 may include a network (e.g., a local area network (LAN), a wide area network (WAN), a metropolitan area network (MAN), a telephone network, such as the public switched telephone network (PSTN), an intranet, the Internet, a VoIP-based network, or a combination of networks) of dedicated Internet customers.

DSL network 140 may include a LAN, a WAN, a MAN, a telephone network, such as the PSTN, an intranet, the Internet, a VoIP-based network, or a combination of networks that provide digital data transmission. For example, in one implementation, DSL network 140 may provide digital data transmission over wires of a local telephone network.

FTTP network 150 may include a LAN, a WAN, a MAN, a telephone network, such as the PSTN, an intranet, the Internet, a VoIP-based network, or a combination of networks that deliver fiber-optic communications via optical fibers provided directly to customers' premises.

ISP 160 may include an entity (e.g., a company or a business) that may provide access to the Internet and related services. For example, ISP 160 may provide a combination of services, such as Internet transit, domain name registration and hosting, web hosting, etc.

Customer device 170 may include a device associated with a customer of services provided by the components of network 100. For example, in one implementation, customer device 170 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop, a personal computer, a VoIP-based device, a firewall, a customer wired or wireless router, an interface between a customer's network and the Internet, or other types of computation or communication devices, threads or processes running on these devices, and/or objects executable by these devices.

Security platform 180 may include one or more server entities, or other types of computation or communication devices, that gather, process, search, and/or provide information in a manner described herein. In one implementation, security platform 180 may include a server (e.g., a computer system or an application) capable of processing attack traffic provided over the components of network 100. In one example, security platform 180 may include a server (e.g., a computer system or an application) capable of performing traffic scrubbing, sinkhole routing, and/or backscatter traceback, as described above. In another example, security platform 180 may include a server (e.g., a computer system or an application) capable of performing security traffic analysis by collecting the attack traffic, mirroring the attack traffic, performing statistical anomaly detection, performing signature-analysis techniques, performing network intelligence, etc.

Network 190 may include a LAN, a WAN, a MAN, a telephone network, such as the PSTN, an intranet, the Internet, a VoIP-based network, or a combination of networks.

Figure 2:
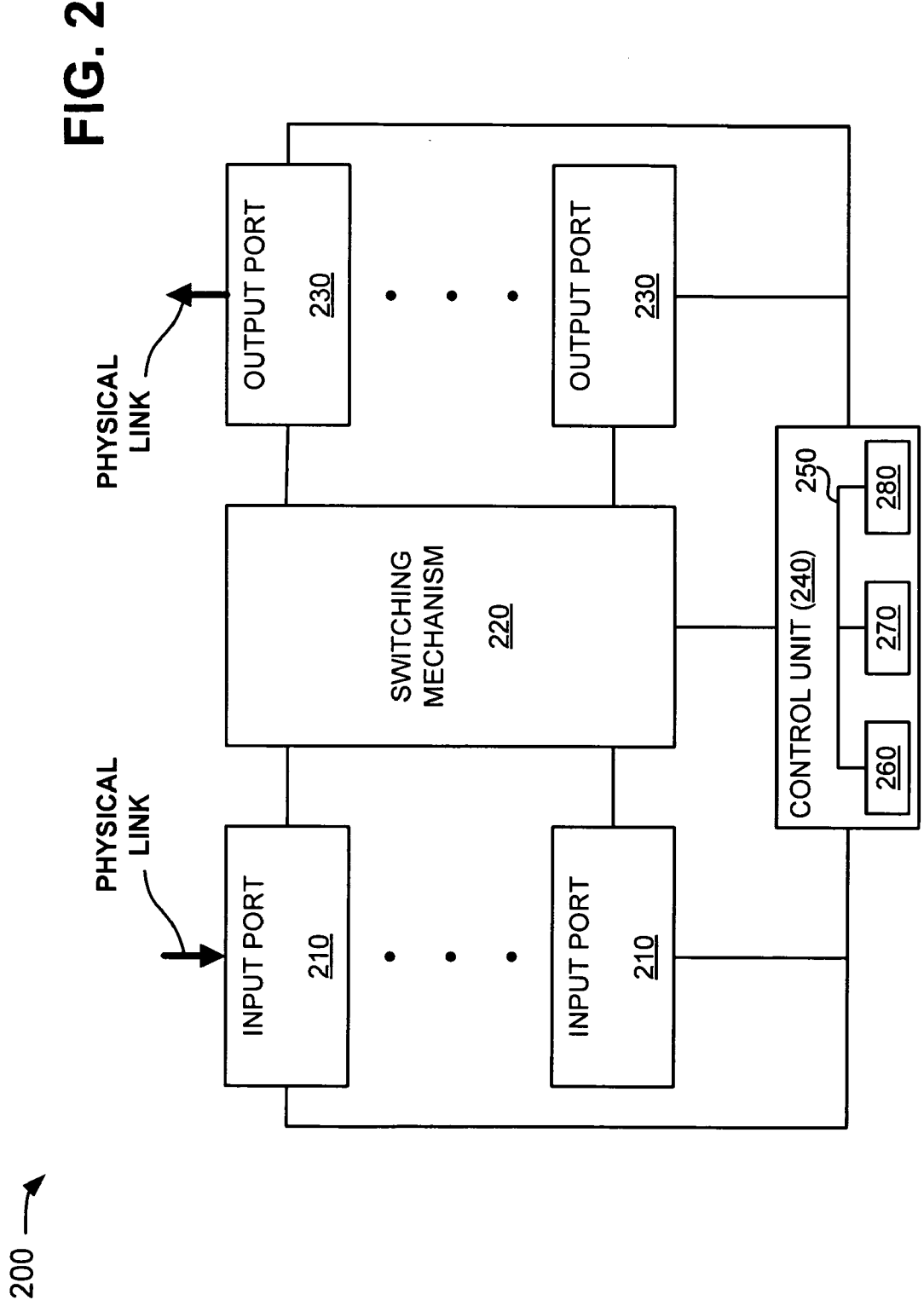
FIG. 2 illustrates exemplary components of network devices and/or a tunnel device of the network depicted in FIG. 1.

FIG. 2 is an exemplary diagram of a device 200 that may correspond to network devices 110 and/or tunnel device 120. As illustrated, device 200 may include input ports 210, a switching mechanism 220, output ports 230, and/or a control unit 240.

Input ports 210 may be the points of attachments for physical links and may be the points of entry for incoming traffic. Input ports 210 may look up a destination address of incoming traffic (e.g., any type or form of data, such as packet or non-packet data) in a forwarding table to determine its destination port (i.e., route lookup). In order to provide quality of service (QoS) guarantees, input ports 210 may classify traffic into predefined service classes. Input ports 210 may run datalink-level protocols and/or network-level protocols.

Switching mechanism 220 may provide a link between input ports 210 and output ports 230. For example, switching mechanism 220 may include a group of switching devices that route traffic from input ports 210 to output ports 230.

Output ports 230 may store traffic before it is transmitted on an output link. Output ports 230 may include scheduling processes that support priorities and guarantees. Output ports 230 may support a variety of higher-level protocols.

Control unit 240 may interconnect with input ports 210, switching mechanism 220, and output ports 230. Control unit 240 may compute a forwarding table, use routing protocols, and/or run software to configure and manage device 200. Control unit 240 may handle any traffic whose destination address may not be found in the forwarding table.

In one implementation, control unit 240 may include a bus 250 that may include a path that permits communication among a processor 260, a memory 270, and a communication interface 280. Processor 260 may include a microprocessor or processing logic (e.g., an application specific integrated circuit (ASIC), field programmable gate array (FPGA), etc.) that may interpret and execute instructions. Memory 270 may include a random access memory (RAM), a read only memory (ROM) device, a magnetic and/or optical recording medium and its corresponding drive, and/or another type of static and/or dynamic storage device that may store information and instructions for execution by processor 260. Communication interface 280 may include any transceiver-like mechanism that enables control unit 240 to communicate with other devices and/or systems.

Device 200 may perform certain operations described herein. Device 200 may perform these operations in response to processor 260 executing software instructions contained in a computer-readable medium, such as memory 270. A computer-readable medium may be defined as a physical or logical memory device.

The software instructions may be read into memory 270 from another computer-readable medium, such as a data storage device, or from another device via communication interface 280. The software instructions contained in memory 270 may cause processor 260 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, or additional components than depicted in FIG. 2.

In still other implementations, one or more components of device 200 may perform one or more other tasks described as being performed by one or more other components of device 200.

Figure 3:
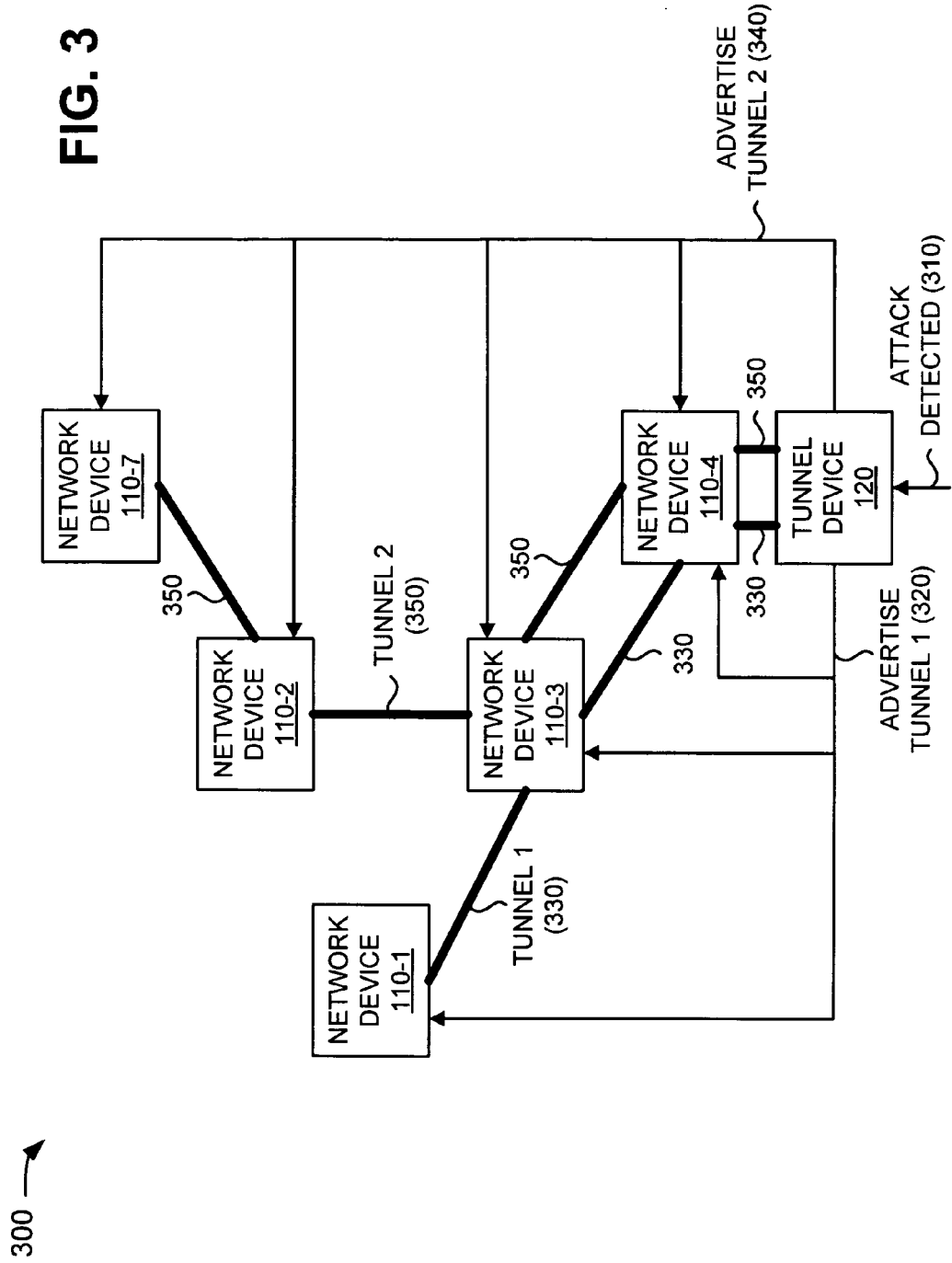
FIG. 3 depicts a diagram of an exemplary portion of the network illustrated in FIG. 1 and exemplary advertising and creation of tunnels among the components of the exemplary network portion.

FIG. 3 depicts a diagram of an exemplary portion 300 of network 100. As illustrated, exemplary network portion 300 may include network devices 110-1, 110-2, 110-3, 110-4, and 110-7, and tunnel device 120. Network devices 110-1, 110-2, 110-3, 110-4, and 110-7, and tunnel device 120 may include the features described above in connection with, for example, FIG. 1.

As further shown in FIG. 3, tunnel device 120 may receive an indication 310 that attack traffic is detected, and may advertise one or more tunnels or paths, directed to tunnel device 120, for receiving the attack traffic. One or more tunnels may be established between one or more network devices (e.g., one or more of network devices 110-1, 110-2, 110-3, 110-4, and 110-7) and tunnel device 120. In one implementation, network portion 300 may include a Multiprotocol Label Switching (MPLS) network that utilizes a signaling protocol to set up the one or more tunnels (or label switched paths (LSPs)) in the MPLS network. MPLS may permit a network to direct a flow of traffic (e.g., attack traffic) along a predetermined path or tunnel (e.g., a LSP) across the network. As part of setting up the LSP, label switching routers (LSRs) (e.g., network devices 110-1, 110-2, 110-3, 110-4, and 110-7) included in the MPLS network may set up a label information base (LIB) which may map an incoming label from an input port of the LSR to an output port of the LSR and to a new label value. The LSRs may forward traffic along links through the MPLS network based on labels attached to the traffic that indicate which LSP to use. The label may be swapped to the new label at each router hop. In this way, a LSP may identify the specific path of nodes (e.g., network devices 110-1, 110-2, 110-3, 110-4, and 110-7) and links that the traffic takes through the MPLS network.

One type of LSP that may be set up in a network executing MPLS includes a traffic engineered LSP. A traffic engineered LSP through a network may be established using a signaling protocol such as RSVP-TE (resource reservation protocol with traffic engineering). RSVP may be used by either a host or routers to request or deliver specific qualities of services (QoS) for application data streams or flows. RSVP may define how applications place reservations and how they may relinquish the reserved resources once the need for them has ended.

As further shown in FIG. 3, tunnel device 120 may provide an advertisement 320 associated with a first tunnel 330 (e.g., "TUNNEL 1") to network devices 110-1, 110-3, and 110-4. In one implementation, advertisement 320 may include BGP extensions that may advertise a route (e.g., first tunnel 330) through network portion 300. For example, the BGP extensions may advertise a next hop of a route (e.g., first tunnel 330) in the fourth or sixth versions of the Internet protocol (IPv4 or IPv6) or virtual private network (VPN) address family. Network devices 110-1, 110-3, and 110-4 may receive advertisement 320, and may establish first tunnel 330 between network devices 110-1, 110-3, and 110-4 and tunnel device 120. First tunnel 330 may include a LSP-based or a RSVP-based tunnel, and may be used to route attack traffic to tunnel device 120. Tunnel device 120 may provide the attack traffic to security platform 180, as described below.

Tunnel device 120 may provide an advertisement 340 associated with a second tunnel 350 (e.g., "TUNNEL 2") to network devices 110-2, 110-3, 110-4, and 110-7. In one implementation, advertisement 340 may include BGP extensions that may advertise a route (e.g., second tunnel 350) through network portion 300. For example, the BGP extensions may advertise a next hop of a route (e.g., second tunnel 350) in the IPv4 address family. Network devices 110-2, 110-3, 110-4, and 110-7 may receive advertisement 340, and may establish second tunnel 350 between network devices 1110-2, 110-3, 110-4, and 110-7 and tunnel device 120. Second tunnel 350 may include a LSP-based or a RSVP-based tunnel, and may be used to route attack traffic to tunnel device 120. Tunnel device 120 may provide the attack traffic to security platform 180, as described below.

In one implementation, the BGP (or other routing protocol) advertisement (e.g., advertisements 320 and 340) may set a next-hop to a tunnel end-point. The advertisement may include tags to identify services. The tunnel may be persistent although in other implementations the tunnel may be dynamically constructed to reduce network load.

Unlike current network security systems, which permit attack traffic to traverse the open network and be detected and utilized by the attackers, the tunnels (e.g., first and second tunnels 330 and 350) created by tunnel device 120 may permit attack traffic to traverse a network undetected and prevent the attackers from utilizing the attack traffic.

Although FIG. 3 shows exemplary components of network portion 300, in other implementations, network portion 300 may contain fewer, different, or additional components than depicted in FIG. 3. In still other implementations, one or more components of network portion 300 may perform one or more other tasks described as being performed by one or more other components of network portion 300. In further implementations, tunnel device 120 may advertise and/or create tunnels (e.g., first tunnel 330 and second tunnel 350) using other signaling protocols, such as generic routing encapsulation (GRE) (e.g., a tunneling protocol designed to encapsulate a wide variety of network layer packets inside IP tunneling packets) and/or IP security (Ipsec) (e.g., a suite of protocols for securing IP communications by authenticating and/or encrypting each IP packet in a data stream).

FIG. 4 illustrates a diagram of another exemplary portion 400 of network 100, and exemplary interactions among the components of network portion 400. As depicted, network portion 400 may include network devices 110-1, 110-3, 110-4, 110-6, and 110-9, tunnel device 120, DIA customers network 130, DSL network 140, customer device 170, and security platform 180. Network devices 110-1, 110-3, 110-4, 110-6, and 110-9, tunnel device 120, DIA customers network 130, DSL network 140, customer device 170, and security platform 180 may include the features described above in connection with, for example, FIG. 1.

As further shown in FIG. 4, customer device 170 may provide an indication 410 of detected attack traffic (e.g., attack traffic 420 provided by DIA customers network 130) to tunnel device 120, after receiving attack traffic 420 provided by DIA customers network 130 and valid traffic 430 provided by DSL network 140. In other implementations, one or more other components of network portion 400 may provide indication 410 to tunnel device 120. Tunnel device 120 may receive indication 410, and may identify a victim (e.g., customer device 170) of attack traffic 420. Tunnel device 120 may select a security platform (e.g., security platform 180) for attack traffic 420.

Tunnel device 120 may advertise one or more tunnels or paths to tunnel device 120 for receiving the attack traffic, as described above in connection with FIG. 3. For example, a tunnel (e.g., first tunnel 330) may be established between network devices 110-1, 110-3, and 110-4, and tunnel device 120 based on advertisements (e.g., advertisement 320) generated by tunnel device 120. If the tunnel is established, attack traffic 420 (e.g., provided by DIA customers network 130) and valid traffic 430 (e.g., provided by DSL network 140) may be routed via the tunnel (e.g., via network devices 110-1, 110-3, and 110-4) to tunnel device 120. Tunnel device 120 may forward valid traffic 430 to its destination (e.g., to customer device 170), and may forward attack traffic 420 to security platform 180.

Tunnel device 120 may receive processed attack traffic 440 from security platform 180, and may forward processed attack traffic 440 to the identified victim (e.g., customer device 170). Unlike current single-topology overlay systems, which do not permit attack traffic to be processed and forwarded to its destination address, the split topology of tunnel device 120 may permit attack traffic 420 to be processed by security platform 180, and forwarded (e.g., as processed attack traffic 440) to its destination (e.g., customer device 170).

Although FIG. 4 shows exemplary components of network portion 400, in other implementations, network portion 400 may contain fewer, different, or additional components than depicted in FIG. 4. In still other implementations, one or more components of network portion 400 may perform one or more other tasks described as being performed by one or more other components of network portion 400.

FIG. 5 depicts a diagram of exemplary functional components of tunnel device 120. As illustrated, tunnel device 120 may include attack detection logic 500, tunnel advertising logic 510, attack traffic forwarding logic 520, and valid traffic forwarding logic 530. The functions described in FIG. 5 may be performed by one or more of the exemplary components of device 200 depicted in FIG. 2.

Attack detection logic 500 may include any hardware or hardware/software based logic (e.g., processor 260) that receives indication 410 of detected attack traffic (e.g., attack traffic 420), identifies a victim of the attack traffic, and selects a security platform for addressing the attack traffic. For example, in one implementation, attack detection logic 500 may determine an identity 540 of the victim of the attack traffic based on indication 410, and may provide victim identity 540 to tunnel advertising logic 510. Attack detection logic 500 may determine a selected security platform 550 for the attack traffic, based on indication 410, and may provide selected security platform 550 to attack traffic forwarding logic 520. In one example, selected security platform 550 may include one or more of traffic scrubbing, sinkhole routing, and/or backscatter traceback, as described above. In another example, selected security platform 550 may include security traffic analysis that may collect the attack traffic, mirror the attack traffic, perform statistical anomaly detection, perform signature-analysis techniques, perform network intelligence, etc.

In one implementation, traffic scrubbing, sinkhole routing, backscatter traceback, and security traffic analysis may be provided by a single security platform (e.g., security platform 180). Attack detection logic 500 may determine selected security platform 550 based on platforms provided by the single security platform. Alternatively, each of traffic scrubbing, sinkhole routing, backscatter traceback, and security traffic analysis may be provided by a corresponding security platform. Attack detection logic 500 may determine selected security platform 550 based on available corresponding security platforms. Attack detection logic 500 may pick a particular security platform based on the type of attack (e.g., traffic scrubbing may be useful for a particular type of attack), the location of the victim, the identity of the victim (e.g., the victim paid for a certain level of service and receives a level of security based on what they paid for), etc. Further details of selecting a security platform are provided below in connection with FIGS. 6A-6C.

Tunnel advertising logic 510 may include any hardware or hardware/software based logic (e.g., processor 260) that receives victim identity 540 from attack detection logic 500, and advertises one or more tunnels (e.g., via advertisement 320 associated with first tunnel 330 or advertisement 340 associated with second tunnel 350). For example, in one implementation, tunnel advertising logic 510 may provide advertisements 320/340 via BGP extensions that may advertise a route (e.g., first and second tunnels 330/350) through a network. Network devices may receive advertisements 320/340, and may establish first and second tunnels 330/350 between the network devices and tunnel device 120. First and second tunnels 330/350 may include LSP-based or RSVP-based tunnels, and may be used to route attack traffic to tunnel device 120.

Attack traffic forwarding logic 520 may include any hardware or hardware/software based logic (e.g., processor 260) that receives selected security platform 550 from attack detection logic 500, receives attack traffic 420 via the tunnel (s) established by tunnel advertising logic 510, and forwards attack traffic 420 based on selected security platform 550. For example, in one implementation, selected security platform 550 may include security platform 180, and attack traffic forwarding logic 520 may forward attack traffic 420 to security platform 180 for processing.

Valid traffic forwarding logic 530 may include any hardware or hardware/software based logic (e.g., processor 260) that receives valid traffic 430 via the tunnel(s) established by tunnel advertising logic 510, receives processed attack traffic 440 (e.g., from security platform 180), and forwards valid traffic 430 and/or processed attack traffic 440 to their destinations. For example, in one implementation, valid traffic forwarding logic 530 may forward valid traffic 430 and/or processed attack traffic 440 to customer device 170, as described above in connection with FIG. 4.

Tunnel device 120 may include a split topology device that receives attack traffic 420 via a first topology (e.g., that may include attack traffic forwarding logic 520), and may forward processed attack traffic 440 to its destination via a second topology (e.g., that may include valid traffic forwarding logic 530).

Although FIG. 5 shows exemplary functional components of tunnel device 120, in other implementations, tunnel device 120 may contain fewer, different, or additional functional components than depicted in FIG. 5. In still other implementations, one or more functional components of tunnel device 120 may perform one or more other tasks described as being performed by one or more other functional components of tunnel device 120.

Figure 6A:
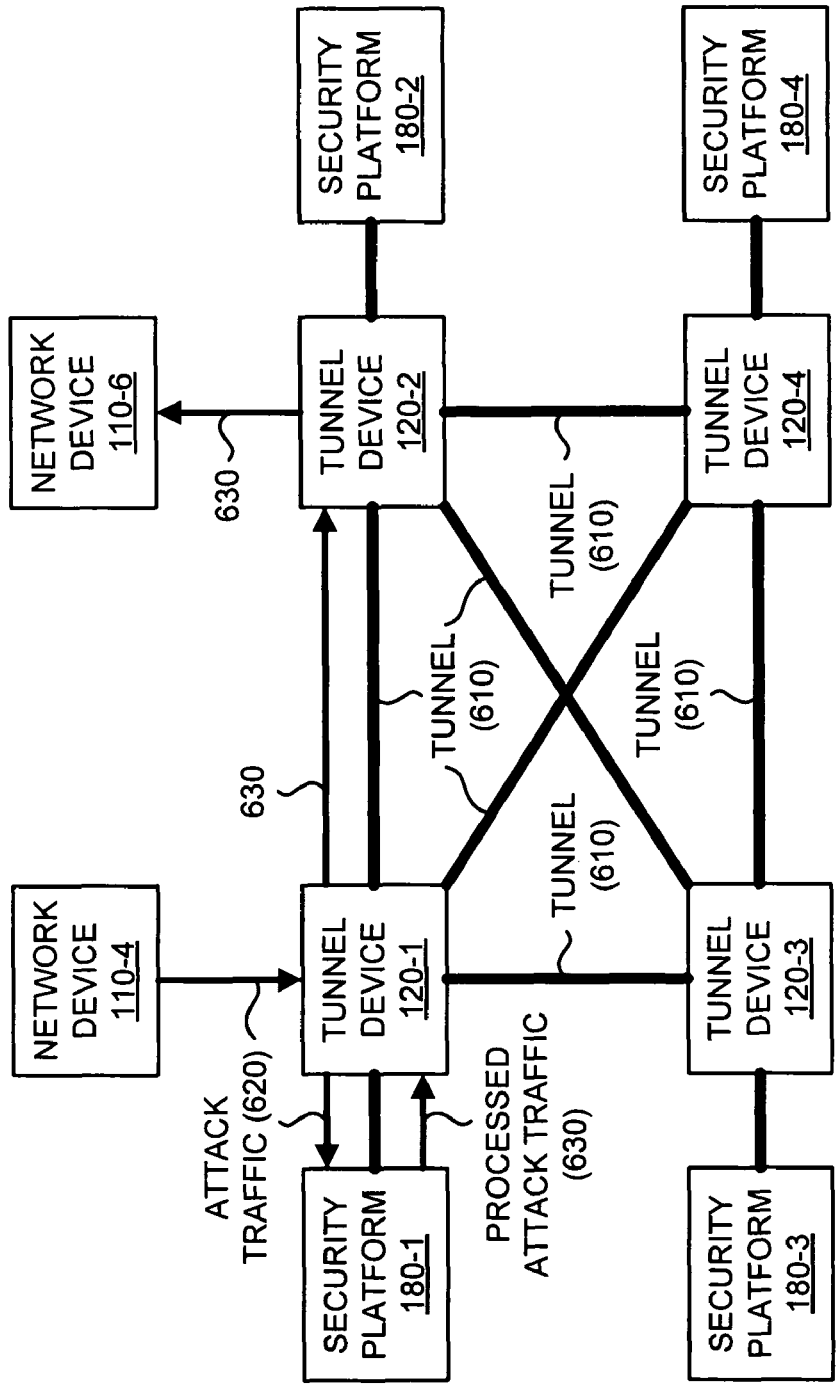
FIGS. 6A-6C illustrate diagrams of an exemplary failsafe mechanism capable of being implemented in the network depicted in FIG. 1.

FIG. 6A illustrates a diagram of an exemplary failsafe mechanism 600 capable of being implemented in a network (e.g., network 100). As depicted in FIG. 6A, failsafe mechanism 600 may include four tunnel devices 120-1, . . . , 120-4 and four associated security platforms 180-1, . . . , 180-4. Each of tunnel devices 120-1, . . . , 120-4 and each of security platforms 180-1, . . . , 180-4 may include the features described above in connection with tunnel device 120 and security platform 180, respectively. In one implementation, each of security platforms 180-1, . . . , 180-4 may provide a different security platform. For example, security platform 180-1 may provide traffic scrubbing, security platform 180-2 may provide sinkhole routing, security platform 180-3 may provide security traffic analysis, and/or security platform 180-4 may provide backscatter traceback. As further shown in FIG. 6A, failsafe mechanism 600 may be associated with network devices 110-4 and 110-6. Each of network devices 110-4 and 110-6 may include the features described above in connection with network devices 110.

One or more tunnels (or paths) 610 may be established among tunnel devices 120-1, . . . , 120-4, and between tunnel devices 120-1, . . . , 120-4 and their associated security platforms 180-1, . . . , 180-4. Tunnels 610 may enable tunnel devices 120-1, . . . , 120-4 to communicate with each other, and may enable attack traffic to be processed even if one or more tunnel devices 120-1, . . . 120-4 is non-operational, as described below in connection with FIGS. 6B and 6C.

As further shown in FIG. 6A, attack traffic 620 from network device 110-4 may be received by tunnel device 120-1. Tunnel device 120-1 may provide attack traffic 620 to security platform 180-1 for processing. Security platform 180-1 may process (e.g., perform traffic scrubbing, sinkhole routing, etc.) attack traffic 620, and may provide processed attack traffic 630 to tunnel device 120-1. Tunnel device 120-1 may provide processed attack traffic 630 to tunnel device 120-2, and tunnel device 120-2 may provide processed attack traffic 630 to network device 110-6 for forwarding to its destination.

Alternatively and/or additionally, tunnel device 120-1 may forward attack traffic 620 to one or more of tunnel devices 120-2, 120-3, and/or 120-4 for processing. For example, tunnel device 120-1 may forward attack traffic 620 to tunnel device 120-2 (e.g., for traffic scrubbing), may forward attack traffic 620 to tunnel device 120-3 (e.g., for sinkhole routing), or may forward attack traffic 620 to tunnel device 120-4 (e.g., for security traffic analysis). Alternatively and/or additionally, tunnel device 120-1 may forward attack traffic 620 to security platform 180-1 for processing, and may forward copies of attack traffic 620 to one or more of tunnel devices 120-2, 120-3, and/or 120-4 for further processing. For example, tunnel device 120-1 may forward a copy of attack traffic 620 to tunnel device 120-2 (e.g., for traffic scrubbing), may forward another copy of attack traffic 620 to tunnel device 120-3 (e.g., for sinkhole routing), and/or may forward still another copy of attack traffic 620 to tunnel device 120-4 (e.g., for security traffic analysis).

Figure 6B:
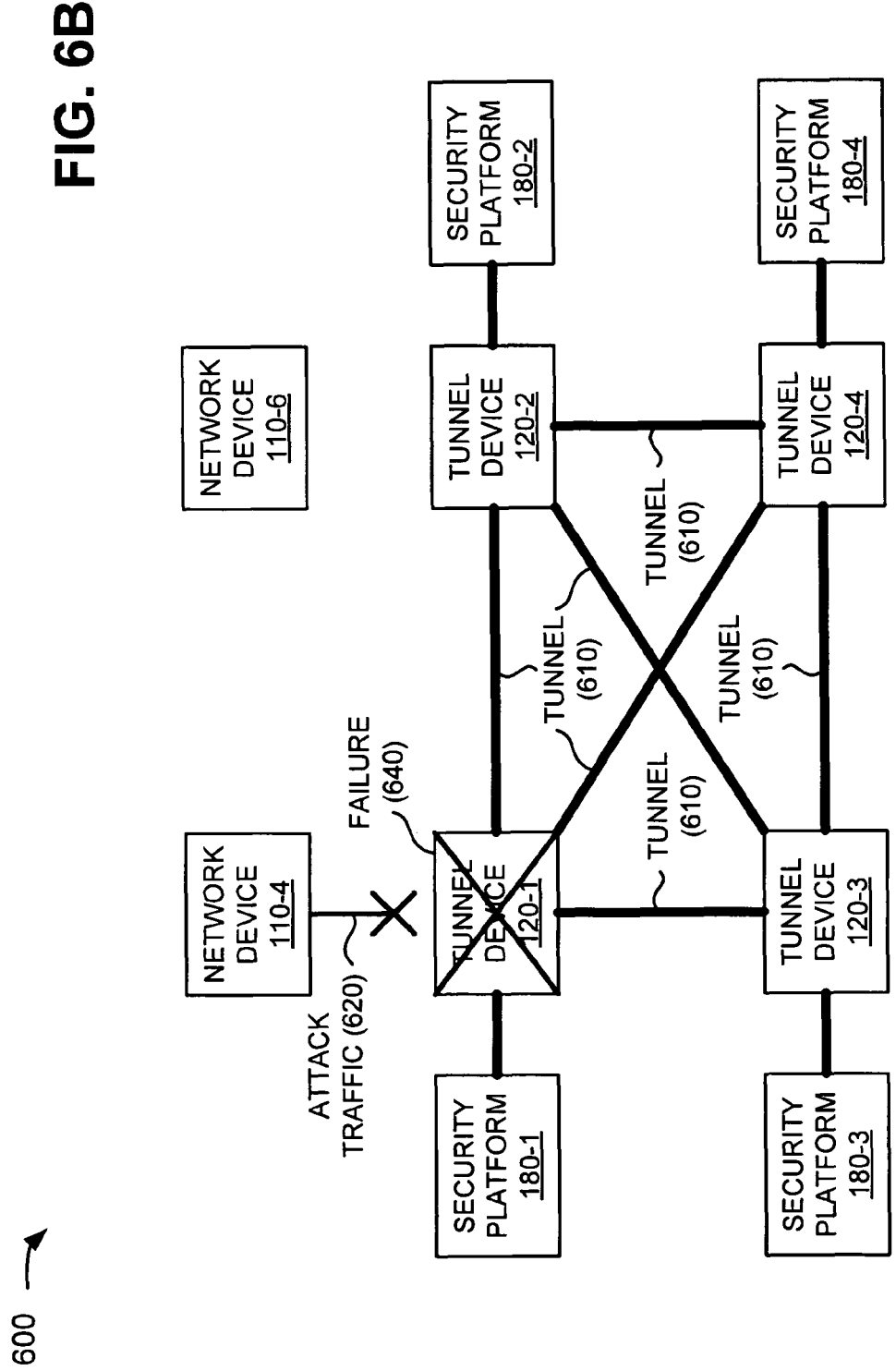
Figure 6C:
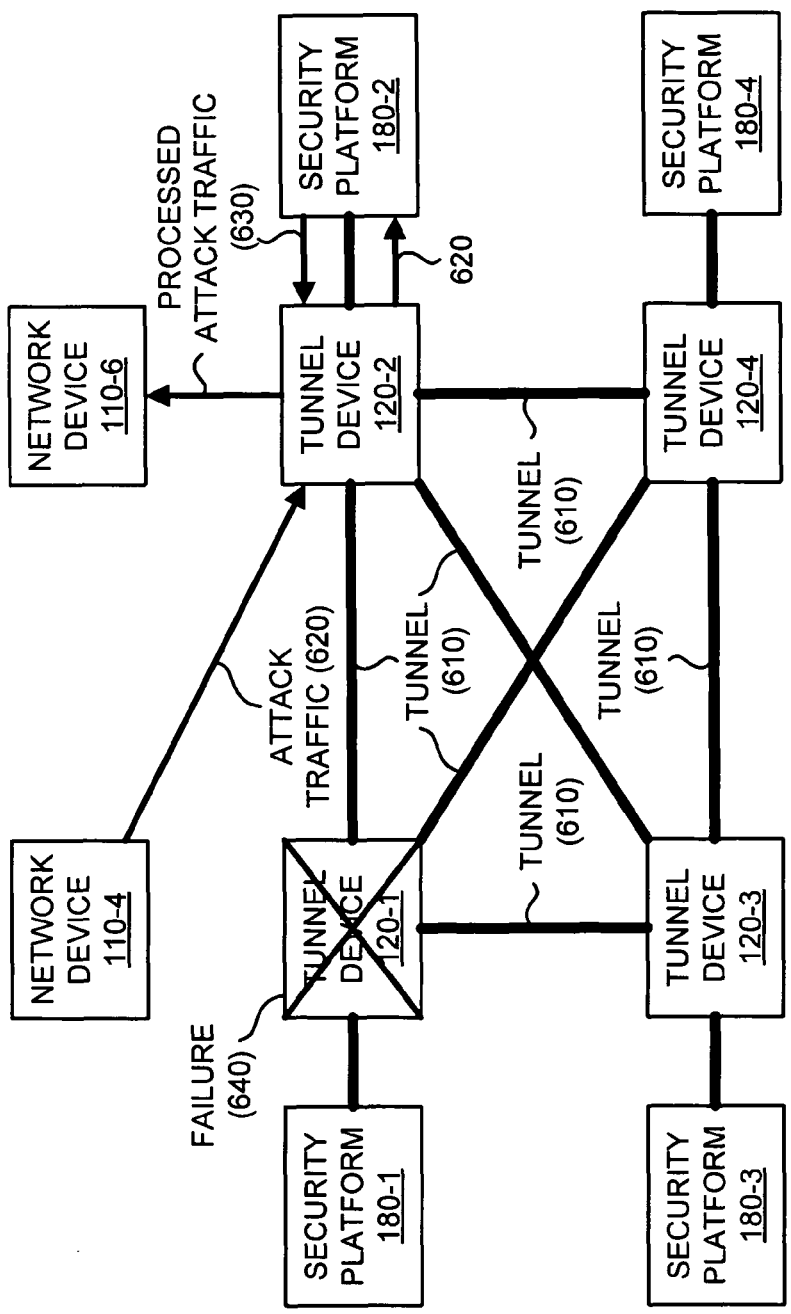

FIGS. 6B and 6C illustrate operation of failsafe mechanism 600 during a failure of one of tunnel devices 120-1, . . . , 120-4. As shown in FIG. 6B, tunnel device 120-1 may experience a failure 640 (e.g., may become non-operational), and attack traffic 620 from network device 110-4 may not be able to reach tunnel device 120-1. As shown in FIG. 6C, network device 110-4 may forward attack traffic 620 to tunnel device 120-2. Tunnel device 120-2 may provide attack traffic 620 to security platform 180-2 for processing. Security platform 180-2 may process (e.g., perform traffic scrubbing, sinkhole routing, etc.) attack traffic 620, and may provide processed attack traffic 630 to tunnel device 120-2. Tunnel device 120-2 may provide processed attack traffic 630 to network device 110-6 for forwarding to its destination.

Alternatively and/or additionally, tunnel device 120-2 may forward attack traffic 620 to one or more of tunnel devices 120-3 and/or 120-4 for processing. For example, tunnel device 120-2 may forward attack traffic 620 to tunnel device 120-3 (e.g., for traffic scrubbing) or may forward attack traffic 620 to tunnel device 120-4 (e.g., for sinkhole routing). Alternatively and/or additionally, tunnel device 120-2 may forward attack traffic 620 to security platform 180-2 for processing, and may forward copies of attack traffic 620 to one or more of tunnel devices 120-3 and/or 120-4 for further processing. For example, tunnel device 120-2 may forward a copy of attack traffic 620 to tunnel device 120-3 (e.g., for traffic scrubbing), and/or may forward another copy of attack traffic 620 to tunnel device 120-4 (e.g., for sinkhole routing).

Although FIGS. 6A-6C show exemplary components of failsafe mechanism 600, in other implementations, failsafe mechanism 600 may contain fewer, different, or additional components than depicted in FIGS. 6A-6C. In still other implementations, one or more components of failsafe mechanism 600 may perform one or more other tasks described as being performed by one or more other components of failsafe mechanism 600.

FIGS. 7-9 depict a flow chart of an exemplary process 700 for directing attack traffic to a security platform for processing and for forwarding the processed attack traffic to its destination, according to implementations described herein. In one implementation, process 700 may be performed by tunnel device 120 and/or one of tunnel devices 120-1, . . . , 120-4. In another implementation, some or all of process 700 may be performed by another device or group of devices, including or excluding tunnel device 120 and/or tunnel devices 120-1, . . . , 120-4.

As illustrated in FIG. 7, process 700 may begin with receipt of an indication of detected attack traffic (block 710), identification of a victim of the attack traffic (block 720), and selection of a security platform for the attack traffic (block 730). For example, in implementations described above in connection with FIG. 5, attack detection logic 500 of tunnel device 120 may receive indication 410 of detected attack traffic (e.g., attack traffic 420), may identify a victim of the attack traffic, and may select a security platform for addressing the attack traffic. In one example, attack detection logic 500 may determine victim identity 540 of the attack traffic based on indication 410, and may provide victim identity 540 to tunnel advertising logic 510 of tunnel device 120. Attack detection logic 500 may determine selected security platform 550 for the attack traffic, based on indication 410, and may provide selected security platform 550 to attack traffic forwarding logic 520 of tunnel device 120. In one example, selected security platform 550 may include traffic scrubbing, sinkhole routing, backscatter traceback, and/or security traffic analysis. Attack detection logic 500 may pick a particular security platform based on the type of attack (e.g., traffic scrubbing may be useful for a particular type of attack), the location of the victim, the identity of the victim (e.g., the victim paid for a certain level of service and receives a level of security based on what they paid for), etc.

As further shown in FIG. 7, a tunnel may be advertised for the security platform (block 740), valid traffic and the attack traffic may be received via the tunnel (block 750), and the valid traffic may be forwarded to its destination (block 760). For example, in implementations described above in connection with FIG. 5, tunnel advertising logic 510 of tunnel device 120 may receive victim identity 540 from attack detection logic 500, and may advertise one or more tunnels (e.g., via advertisement 320 associated with first tunnel 330 or advertisement 340 associated with second tunnel 350). Network devices may receive advertisements 320/340, and may establish first and second tunnels 330/350 between the network devices and tunnel device 120. Attack traffic forwarding logic 520 of tunnel device 120 may receive selected security platform 550 from attack detection logic 500, and may receive attack traffic 420 via the tunnel(s) established by tunnel advertising logic 510. Valid traffic forwarding logic 530 of tunnel device 120 may receive valid traffic 430 via the tunnel (s) established by tunnel advertising logic 510, and may forward valid traffic 430 to its destination. In one example, in one implementation, valid traffic forwarding logic 530 may forward valid traffic 430 to customer device 170.

Returning to FIG. 7, the attack traffic may be forwarded to the selected security platform (block 770), processed traffic may be received from the security platform (block 780), and the processed traffic may be forwarded to the victim (block 790). For example, in implementations described above in connection with FIG. 5, attack traffic forwarding logic 520 of tunnel device 120 may receive selected security platform 550 from attack detection logic 500, and may forward attack traffic 420 based on selected security platform 550. In one example, selected security platform 550 may include security platform 180, and attack traffic forwarding logic 520 may forward attack traffic 420 to security platform 180 for processing. Valid traffic forwarding logic 530 of tunnel device 120 may receive processed attack traffic 440 (e.g., from security platform 180), and may forward processed attack traffic 440 to its destination. In one example, valid traffic forwarding logic 530 may forward processed attack traffic 440 to customer device 170.

Process block 730 may include the process blocks depicted in FIG. 8. As shown in FIG. 8, process block 730 may include selecting traffic scrubbing as the security platform (block 800), selecting sinkhole routing as the security platform (block 810), selecting security traffic analysis as the security platform (block 820), and/or selecting backscatter traceback as the security platform (block 830). For example, in implementations described above in connection with FIG. 5, attack detection logic 500 of tunnel device 120 may determine selected security platform 550 for the attack traffic, based on indication 410. In one example, selected security platform 550 may include traffic scrubbing, sinkhole routing, and/or backscatter traceback. In another example, selected security platform 550 may include security traffic analysis that may collect the attack traffic, mirror the attack traffic, perform statistical anomaly detection, perform signature-analysis techniques, perform network intelligence, etc. Attack detection logic 500 may pick a particular security platform based on the type of attack (e.g., traffic scrubbing may be useful for a particular type of attack), the location of the victim, the identity of the victim (e.g., the victim paid for a certain level of service and receives a level of security based on what they paid for), etc.

Process block 740 may include the process blocks depicted in FIG. 9. As shown in FIG. 9, process block 740 may include advertising an MPLS based tunnel for the security platform (block 900), advertising a RSVP based tunnel for the security platform (block 910), advertising an Internet protocol security (Ipsec) based tunnel for the security platform (block 920), and/or advertising a GRE based tunnel for the security platform (block 930). For example, in implementations described above in connection with FIG. 3, tunnel device 120 may provide advertisement 320 associated with first tunnel 330 (e.g., "TUNNEL 1") to network devices 110-1, 110-3, and 110-4. Advertisement 320 may include BGP extensions that may advertise a route (e.g., first tunnel 330) through network portion 300. Network devices 110-1, 110-3, and 110-4 may receive advertisement 320, and may establish first tunnel 330 between network devices 110-1, 110-3, and 110-4 and tunnel device 120. First tunnel 330 may include a LSP-based or a RSVP-based tunnel, and may be used to route attack traffic to tunnel device 120. Tunnel device 120 may provide the attack traffic to security platform 180. Tunnel device 120 may advertise and/or create tunnels (e.g., first tunnel 330 and second tunnel 350) using other signaling protocols, such as generic routing encapsulation (GRE) and/or IP security (IPsec).

Systems and/or methods described herein may provide a security overlay network that may advertise one or more tunnels directed to a security platform, and may direct attack traffic to the security platform via the one or more tunnels. Systems and/or methods may process the attack traffic via the security platform, and may forward the processed traffic to its destination. For example, in one implementation, a device (e.g., a split topology tunnel device) may receive an indication of detected attack traffic, may identify a victim of the attack traffic, and may select a security platform for the attack traffic. The device may advertise a tunnel for the security platform, may receive valid and attack traffic via the tunnel, and may forward the valid traffic to a destination associated with the valid traffic. The device may forward the attack traffic to the security platform via the tunnel, may receive processed traffic from the security platform, and may forward the processed traffic to the victim of the attack traffic.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7-9, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method, comprising:
receiving, via a tunnel device, an indication of detected attack traffic associated with a network;
identifying, via a tunnel device, an intended recipient of the detected attack traffic;
selecting, via the tunnel device, information identifying a security platform for processing the detected attack traffic;
advertising, via the tunnel device, a tunnel in the network for the selected security platform;
receiving, via the tunnel device, the detected attack traffic via the advertised tunnel;
forwarding, via the tunnel device, the detected attack traffic, to the selected security platform, for processing to obtain processed traffic;

receiving, via the tunnel device, the processed traffic from the selected security platform; and forwarding, via the tunnel device and the network, the processed traffic, received from the selected security platform, to the intended recipient.

2. The computing-device implemented method of claim 1, further comprising:

receiving, via the tunnel device and the network, valid traffic associated with the network; and forwarding, via the tunnel device and the network, the valid traffic to one or more destinations associated with the valid traffic.

3. The computing device-implemented method of claim 1, where selecting, via the tunnel device, the security platform for processing the detected attack traffic comprises at least one of:

selecting, via the tunnel device, traffic scrubbing as the security platform for processing the detected attack traffic, selecting, via the tunnel device, sinkhole routing as the security platform for processing the detected attack traffic, selecting, via the tunnel device, security traffic analysis as the security platform for processing the detected attack traffic, or selecting, via the tunnel device, backscatter traceback as the security platform for processing the detected attack traffic.

4. The computing device-implemented method of claim 1, where advertising, via the tunnel device, the tunnel in the network for the selected security platform comprises at least one of:

advertising, via the tunnel device, a Multiprotocol Label Switching (MPLS) based tunnel in the network for the selected security platform, advertising, via the tunnel device, an Internet protocol security (IPsec) based tunnel in the network for the selected security platform, or advertising, via the tunnel device, a generic routing encapsulation (GRE) based tunnel in the network for the selected security platform.

5. The computing device-implemented method of claim 1, where the detected attack traffic comprises at least one of:

a denial of service (DoS) attack, an excessive traffic and resource depletion attack, or a routing or network control protocol attack.

6. The computing device-implemented method of claim 1, where receiving the detected attack traffic via the advertised tunnel includes receiving the detected attack traffic, via the advertised tunnel in the network, without the detected attack traffic being detected while the detected attack traffic is being transmitted, in the network, to the tunnel device.

7. The computing device-implemented method of claim 1, where advertising, via the tunnel device, the tunnel in the network for the selected security platform comprises:

advertising, via the tunnel device, a next-hop of a tunnel end-point for a given route via a border gateway protocol (BGP).

8. The computing device-implemented method of claim 1, where the tunnel device comprises a split topology tunnel device.

9. The computing device-implemented method of claim 8, where:

receiving the detected attack traffic via the advertised tunnel further comprises receiving the detected attack traffic via a first topology of the split topology tunnel device; and forwarding the processed traffic comprises forwarding the processed traffic via a second topology, of the split topology tunnel device, that is different than the first topology.

10. The computing device-implemented method of claim 3, where the processed traffic is obtained based on the detected attack traffic being processed via the at least one of:

the traffic scrubbing;

the sinkhole routing;

the security traffic analysis; or the backscatter traceback.

11. A device, comprising:

processing logic to:

receive an indication of detected attack traffic associated with a network, identify a device targeted by the detected attack traffic, select information identifying a security platform for processing the detected attack traffic, advertise a tunnel in the network for the selected security platform, receive the detected attack traffic via the advertised tunnel, forward the detected attack traffic, to the selected security platform, for processing to obtain processed traffic, receive the processed traffic from the selected security platform, and forward, via the network, the processed traffic, received from the security platform, to the device targeted by the detected attack traffic.

12. The device of claim 11, where the processing logic is further to:

receive, via the network, valid traffic associated with the network, and forward, via the network, the valid traffic to one or more destinations associated with the valid traffic.

13. The device of claim 11, where, when selecting the security platform for processing the detected attack traffic, the processing logic is further to at least one of:

select traffic scrubbing as the security platform for processing the detected attack traffic, select sinkhole routing as the security platform for processing the detected attack traffic, select security traffic analysis as the security platform for processing the detected attack traffic, or select backscatter traceback as the security platform for processing the detected attack traffic, where the at least one of the traffic scrubbing, the sinkhole routing, the security traffic analysis, or the backscatter traceback is selected based on at least one of:

a type of the detected attack traffic, a location associated with the device targeted by the detected attack traffic, or information identifying a user of the device targeted by the detected attack traffic.

14. The device of claim 11, where, when advertising the tunnel in the network for the selected security platform, the processing logic is further to at least one of:

advertise a resource reservation protocol (RSVP)-based Multiprotocol Label Switching (MPLS) label switched path (LSP) tunnel in the network for the selected security platform, advertise an Internet protocol security (IPsec) based tunnel in the network for the selected security platform, or advertise a generic routing encapsulation (GRE) based tunnel in the network for the selected security platform.

15. The device of claim 11, where the detected attack traffic comprises at least one of:
 a denial of service (DoS) attack,
 an excessive traffic and resource depletion attack, or
 a routing or other network control protocol attack.

16. The device of claim 11, where the advertised tunnel:
 permits the detected attack traffic to be securely transmitted, in the network, to the device, and
 prevents the detected attack traffic from being detected while the detected attacked is being transmitted, in the network, to the device.

17. The device of claim 11, where, when advertising the tunnel in the network for the selected security platform, the processing logic is further to:
 advertise a next-hop of a tunnel end-point for a given route via a border gateway protocol (BGP).

18. The device of claim 11, where the device comprises a split topology tunnel device.

19. The device of claim 18, where:
 when receiving the detected attack traffic via the advertised tunnel, the processing logic is further to receive the detected attack traffic via a first topology of the split topology tunnel device; and
 when forwarding the processed traffic to the device targeted by the detected attack traffic, the processing logic is further to forward the processed traffic via a second topology of the split topology tunnel device that is different than the first topology.

20. The device of claim 11, where the processed traffic comprises at least one of:
 the detected attack traffic processed via traffic scrubbing,
 the detected attack traffic processed via sinkhole routing,
 the detected attack traffic processed via security traffic analysis, or
 the detected attack traffic processed via backscatter traceback.

21. A system, comprising:
 a plurality of tunnel devices, each tunnel device, of the plurality of tunnel devices, being associated with a corresponding one of a plurality of security devices and at least one tunnel device, of the plurality of tunnel devices, comprising processing logic to:
 receive an indication of detected attack traffic associated with a network,
 identify an intended recipient of the detected attack traffic,
 select a security device from the plurality of security devices for processing the detected attack traffic,
 advertise a tunnel in the network for the selected security device,
 receive the detected attack traffic via the advertised tunnel,
 forward the detected attack traffic, to the selected security device, for processing to obtain processed traffic,
 receive the processed traffic from the selected security device, and
 forward, via the network, the processed traffic, received from the selected security device, to the intended recipient.

22. The system of claim 21, where the processed traffic corresponds to first processed traffic, and
 where the processing logic of the at least one tunnel device is further to:
 forward a copy of the detected attack traffic, to another security device of the plurality of security devices, for processing to obtain second processed traffic; and
 receive the second processed traffic from the another one of the plurality of security device.

23. The system of claim 21, where, when one of the plurality of tunnel devices is non-operational, the detected attack traffic is received by one of remaining one or more of the plurality of tunnel devices.

24. The system of claim 21, where the selected security device is associated with one of the plurality of tunnel devices other than the tunnel device that receives the detected attack traffic via the advertised tunnel.

* * * * *